United States Patent
Qian et al.

(10) Patent No.: US 12,169,028 B2
(45) Date of Patent: Dec. 17, 2024

(54) HYDROGEN SUPPLY COMBINATION VALVE HAVING FLOW REGULATION AND PRESSURE STABILIZATION FUNCTIONS

(71) Applicant: ZHEJIANG UNIVERSITY, Zhejiang (CN)

(72) Inventors: Jinyuan Qian, Zhejiang (CN); Longjie Yu, Zhejiang (CN); Kan Sheng, Zhejiang (CN); Yixiang Xu, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/661,685

(22) Filed: May 12, 2024

(65) Prior Publication Data
US 2024/0295273 A1 Sep. 5, 2024

Related U.S. Application Data

(63) Continuation of application No. PCT/CN2023/071680, filed on Jan. 10, 2023.

(30) Foreign Application Priority Data

Mar. 24, 2022 (CN) .......................... 202210301502.2

(51) Int. Cl.
*F16K 17/04* (2006.01)
*F17C 13/04* (2006.01)
(Continued)

(52) U.S. Cl.
CPC ............ *F16K 17/048* (2013.01); *F17C 13/04* (2013.01); *H01M 8/04089* (2013.01);
(Continued)

(58) Field of Classification Search
CPC ... F16K 17/048; F17C 13/04; G05D 16/0402; Y10T 137/7795
See application file for complete search history.

(56) References Cited

U.S. PATENT DOCUMENTS

2017/0115673 A1* 4/2017 Kobayashi ........... G05D 16/106

FOREIGN PATENT DOCUMENTS

| CN | 105003703 | 10/2015 |
| CN | 106090363 | 11/2016 |

(Continued)

OTHER PUBLICATIONS

"International Search Report (Form PCT/ISA/210) of PCT/CN2023/071680", mailed on Apr. 28, 2023, with English translation thereof, pp. 1-6.

(Continued)

*Primary Examiner* — Kenneth Rinehart
*Assistant Examiner* — Nicole Gardner
(74) *Attorney, Agent, or Firm* — JCIPRNET

(57) ABSTRACT

A hydrogen supply combination valve having flow regulation and pressure stabilization functions includes a first-stage pressure reduction valve, a second-stage pressure reduction and flow regulation valve, and a second-stage pressure reduction and regulation valve. The first-stage pressure reduction valve realizes main throttling and pressure reduction effects, and performs first-stage pressure reduction on high-pressure hydrogen. The second-stage pressure reduction and flow regulation valve can further perform second-stage pressure reduction on the hydrogen after first-stage pressure reduction, and can realize flow regulation. The second-stage pressure reduction and regulation valve can further perform second-stage pressure reduction on the hydrogen after first-stage pressure reduction.

10 Claims, 4 Drawing Sheets

(51) Int. Cl.
   H01M 8/04082       (2016.01)
   H01M 8/04089       (2016.01)
(52) U.S. Cl.
   CPC . *H01M 8/04201* (2013.01); *F17C 2205/0323* (2013.01); *F17C 2205/0338* (2013.01); *F17C 2205/0385* (2013.01); *F17C 2221/012* (2013.01); *F17C 2223/035* (2013.01); *F17C 2223/036* (2013.01)

(56) References Cited

FOREIGN PATENT DOCUMENTS

| | | |
|---|---|---|
| CN | 108087602 | 5/2018 |
| CN | 210461828 | 5/2020 |
| CN | 111365503 | 7/2020 |
| CN | 114688324 | 7/2022 |
| JP | 2012142179 | 7/2012 |
| JP | 2016118923 | 6/2016 |
| JP | 2016184258 | 10/2016 |
| JP | 2017045176 | 3/2017 |

OTHER PUBLICATIONS

"Written Opinion of the International Searching Authority (Form PCT/ISA/237) of PCT/CN2023/071680", mailed on Apr. 28, 2023, with English translation thereof, pp. 1-8.

\* cited by examiner

HYDROGEN SUPPLY COMBINATION VALVE HAVING FLOW REGULATION AND PRESSURE STABILIZATION FUNCTIONS

CROSS-REFERENCE TO RELATED APPLICATION

This application is a continuation of international application of PCT application serial no. PCT/CN2023/071680, filed on Jan. 10, 2023, which claims the priority benefit of China application no. 202210301502.2, filed on Mar. 24, 2022. The entirety of each of the above-mentioned patent applications is hereby incorporated by reference herein and made a part of this specification.

BACKGROUND

Technical Field

The disclosure belongs to the field of valves, and particularly relates to a hydrogen supply combination valve having flow regulation and pressure stabilization functions.

Description of Related Art

High-pressure hydrogen storage bottles are used to store high-pressure gaseous hydrogen with a temperature above the critical temperature. The functions needed to be realized of an ideal hydrogen supply combination valve include two aspects. The first aspect is to reduce the hydrogen pressure to the rated range; the second aspect is to accurately control the hydrogen flow, achieve stable pressure reduction, and control the amount of flow as needed. At present, in order to ensure that the pressure of hydrogen entering the fuel cell is within the normal range and prevent overpressure during the hydrogenation process, dual pressure reducing valves can be used to reduce the pressure. The output pressure is stable, but performing flow regulation while maintaining the same pressure is a problem. The more connections between valves, the more complex the pipelines are, and the more potential safety hazards may present. Therefore, the research on the integrated combination of hydrogen supply combination valve is of great significance. The hydrogen supply combination valve usually comprises a pressure reducing valve, a solenoid valve, and a temperature and pressure sensor. The pressure reducing valve realizes the stability of flow and pressure. The solenoid valve is usually installed after the pressure reducing valve to realize the switching, opening, and closing of the entire hydrogen supply circuit.

SUMMARY

The purpose of the disclosure is to solve the problem in the related art that the pressure reduction valve cannot simultaneously meet the two technical requirements of stable output pressure and hydrogen flow regulation, thereby a hydrogen supply combination valve having flow regulation and pressure stabilization functions is provided.

In order to achieve the above purpose, the technical solution adopted by the disclosure is as follows.

A hydrogen supply combination valve having flow regulation and pressure stabilization functions, which includes a combination valve body, a first-stage pressure reduction valve, a second-stage pressure reduction and flow regulation valve, and a second-stage pressure reduction and regulation valve, and the first-stage pressure reduction valve, the second-stage pressure reduction and flow regulation valve, and the second-stage pressure reduction and regulation valve are installed in the combination valve body through a first valve base, a second valve base, and a third valve base respectively. The combination valve body is disposed with a first-stage outlet flow channel, a connecting flow channel, a second-stage outlet flow channel, and a pressure regulating hydrogen storage flow channel. The first-stage outlet flow channel communicates with the connecting flow channel, and the second-stage outlet flow channel serves as a final output flow channel of the hydrogen supply combination valve.

The first-stage pressure reduction valve is used to connect an external hydrogen source and perform first-stage pressure reduction on hydrogen input and input into the first-stage outlet flow channel.

The second-stage pressure reduction and flow regulation valve includes a second sealing piston, a second actuator, a third spring, a second throttling bottom base, and a fourth spring. The second valve base does not penetrate the combination valve body, and the second sealing piston is sealed and fixed at the opening end of the second valve base, the second actuator and the second throttling bottom base are installed in the second valve base, the second actuator is located between the second throttling bottom base and the second sealing piston, and a protruding blocking ring is disposed on a side of the second sealing piston toward the second actuator. The inner cavity of the second valve base is separated by the second sealing piston, the second actuator, and the second throttling bottom base to form a first chamber, a second chamber, and a third chamber independently from the opening end to an inner bottom surface sequentially. The third spring in a compressed state is disposed between the second actuator and the second throttling bottom base, and the fourth spring in a compressed state is disposed between the second throttling bottom base and the inner bottom surface of the second valve base. A secondary-stage outlet flow channel configured to communicate with the second chamber and the third chamber is opened at the center of the second throttling bottom base. An end of the second actuator is a second tapered structure, and the second tapered structure cooperates with the second throttling bottom base to form a second throttling section at the inlet position of the secondary-stage outlet flow channel.

The second-stage pressure reduction and regulation valve includes a third sealing piston, a fifth spring, a third throttling bottom base, and a sixth spring. The third valve base does not penetrate the combination valve body, and the third sealing piston is sealed and fixed at the opening end of the third valve base, the third throttling bottom base is installed in the third valve base, and the inner cavity of the third valve base is separated by the third sealing piston and the third throttling bottom base to form a fourth chamber and a fifth chamber independently from the opening end to the inner bottom surface sequentially. The fifth spring in a compressed state is disposed between the third sealing piston and the third throttling bottom base, and the sixth spring in a compressed state is disposed between the third throttling bottom base and the inner bottom surface the third valve base. A tertiary-stage outlet flow channel configured to communicate with the fourth chamber and the fifth chamber is opened at the center of the third throttling bottom base. The end of the third sealing piston is a third tapered structure, and the third tapered structure cooperates with the third throttling bottom base to form a third throttling section at an inlet position of the tertiary-stage outlet flow channel.

The second chamber and the fourth chamber communicate with the connecting flow channel through a first channel and a second channel respectively, the third chamber and the fifth chamber communicate with the second-stage outlet flow channel respectively, and the first chamber and the second-stage outlet flow channel communicate with the pressure regulating hydrogen storage flow channel through a third channel and a fourth channel respectively. A first connection of the pressure regulating hydrogen storage flow channel and the third channel and a second connection of the pressure regulating hydrogen storage flow channel and the fourth channel are kept apart, and the pressure regulating hydrogen storage flow channel between the first connection and the second connection serves as a pressure regulating section. The pressure regulating hydrogen storage flow channel is disposed with a controllable sliding piston forming a piston pair with the inner wall of a flow channel, and a sliding stroke of the controllable sliding piston in the pressure regulating hydrogen storage flow channel covers the pressure regulating section. The controllable sliding piston controls the opening of the second throttling section by changing the pressure in the first chamber during a sliding process in the pressure regulating section, thereby hydrogen flow output from the second-stage outlet flow channel is changed.

As a preferable option, the first-stage pressure reduction valve includes an inlet flow channel, a first throttling bottom base, a first actuator, an actuator internal flow channel, a first sealing piston, a first spring, and a second spring. The first valve base penetrates the combination valve body entirely. The first throttling bottom base and the first sealing piston are sealed and fixed at the openings at two ends of the first valve base respectively. The first valve base is disposed with the inlet flow channel penetratingly. The first actuator is installed in the first valve base and is located between the first throttling bottom base and the first sealing piston. An end of the first actuator is a first tapered structure, and the first tapered structure cooperates with the first throttling bottom base to form a first throttling section at an outlet end of the inlet flow channel. The first spring in a compressed state is disposed between the first actuator and the first sealing piston, the second spring in a compressed state is disposed between the first actuator and the first throttling bottom base, and the first spring and the second spring exert pressures of two opposite directions on the first actuator respectively. The first actuator is disposed with the actuator internal flow channel that communicating with the top surface of the first actuator. The inlet end of the inlet flow channel is used to connect the external hydrogen source. The hydrogen input sequentially passes through the inlet flow channel, the first throttling section, and the actuator internal flow channel and then enters the first-stage outlet flow channel.

As a preferable option, the first throttling bottom base and the first sealing piston are both disposed with spring install holes coaxially at an install position of the first spring, and a disk with hole communicating with the actuator internal flow channel is placed at the bottom of the spring install hole of the first throttling bottom base. An end of the first spring is supported on the disk with hole, and another end is supported in the spring install hole of the first sealing piston.

As a preferable option, between the first sealing piston and the first valve base inner wall, between the first throttling bottom base and the first valve base inner wall, and between the first throttling bottom base and the first actuator are all sealed and connected through first sealing gaskets.

As a preferable option, the first-stage outlet flow channel and the connecting flow channel are both drilled from the surface of the combination valve body to the inside, and opening ends thereof located on the surface of the combination valve body are all sealed with cylindrical seals.

As a preferable option, the controllable sliding piston is disposed with a control rod, and the control rod extends out of the combination valve body and maintains dynamically sealed at a contact position with the combination valve body.

As a preferable option, the position of the connection between the third channel and the side wall of the first chamber is in a range of the height of the blocking ring.

As a preferable option, the second actuator includes the second tapered structure connected below a circular plate, the side wall of the second valve base has a stepped surface, and a second sealing gasket is placed on the stepped surface. When moving in a direction of the second throttling bottom base, the circular plate may be pressed on the second sealing gasket to ensure that the first chamber and the second chamber are sealed and not communicated.

As a preferable option, the controllable sliding piston may completely close the second throttling section during the sliding process in the pressure regulating section.

As a preferable option, the range of the hydrogen pressure of the external hydrogen source is in a range of 10 to 70 MPa. After the hydrogen passes through the first-stage pressure reduction valve, the pressure of the hydrogen is reduced to a range of 2 to 3 MPa. After the hydrogen passes through the second-stage pressure reduction and flow regulation valve, the pressure of the hydrogen is reduced to a working pressure of an on-board hydrogen fuel cell. After the hydrogen passes through the second-stage pressure reduction and flow regulation valve, the pressure of the hydrogen is reduced to the working pressure of the on-board hydrogen fuel cell.

Compared with related art, the beneficial effects of the disclosure are as follows.

(1) The disclosure stabilizes the outlet pressure as much as possible while achieving the outlet flow regulation of the hydrogen supply combination valve by disposing a two-stage pressure reduction process, and disposing the second-stage pressure reduction and flow regulation valve and the second-stage pressure reduction and regulation valve in parallel in the second-stage pressure reduction. The outlet hydrogen flow is merely regulated through the second-stage pressure reduction and flow regulation valve, while the second-stage pressure reduction and regulation valve maintains a continuous and stable flow output to buffer the fluctuations of the pressure caused by flow regulation of the second-stage pressure reduction and flow regulation valve, thereby the fluctuations of the outlet pressure of the whole valve during the flow regulation process is significantly reduced, which not merely reduces the hydrogen pressure to the rated range, but also accurately controls the hydrogen flow.

(2) The disclosure may be applied to fields such as the on-board hydrogen supply, while achieving integration of two-stage pressure reduction and stabilization into the hydrogen combination valve, the output flow of the hydrogen supply combination valve can be regulated, and power changes of on-board hydrogen supply can be achieved.

DESCRIPTION OF THE EMBODIMENTS

In order to make the above purposes, features, and advantages of the disclosure more comprehensible, specific embodiments of the disclosure will be described in detail below with reference to the accompanying drawings. In the following description, various specific details are set forth in order to provide a thorough understanding of the disclosure. However, the disclosure may be implemented in many other ways different from the implementation manners described here. Persons skilled in the art may make similar improvements without departing from the spirit of the disclosure. Therefore, the disclosure is not limited by the embodiments disclosed below. The technical features in each embodiment of the disclosure may be combined accordingly as long as the features do not conflict with each other.

In the description of the disclosure, it should be understood that when an element is considered to "connect" another element, the element may be directly connected to another element or indirectly connected, that is, there is an intermediate element. In contrast, when an element is said to be "directly" connected to another element, there are no intermediate elements.

In the description of the disclosure, it should be understood that the terms "first" and "second" are merely used for differentiation and description purposes, and cannot be understood as indicating or implying importance or implicitly indicating the quantity of indicated technical features. Therefore, features defined by "first" and "second" may explicitly or implicitly include at least one of the features.

Figure 1:
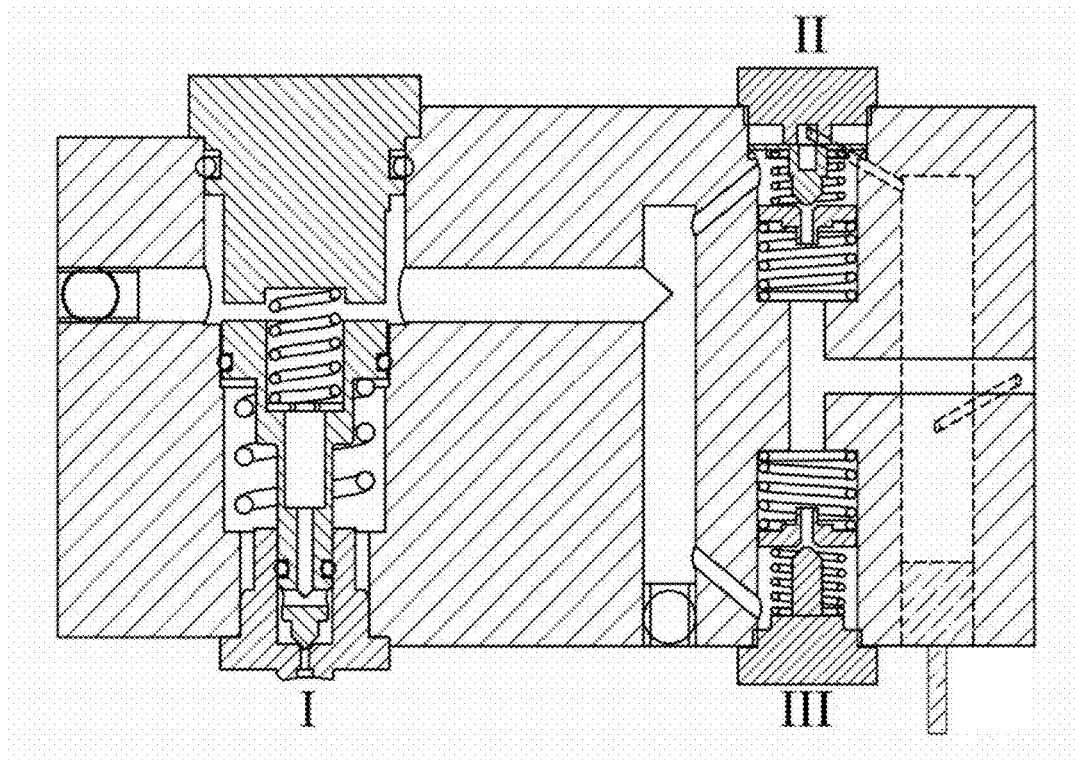
FIG. 1 is a schematic structural diagram of a hydrogen supply combination valve having flow regulation and pressure stabilization functions according to an embodiment of the disclosure.

As shown in FIG. 1, in a preferred embodiment of the disclosure, a hydrogen supply combination valve having flow regulation and pressure stabilization functions is provided, whose main components include a combination valve body, a first-stage pressure reduction valve I, a second-stage pressure reduction and flow regulation valve II, and a second-stage pressure reduction and regulation valve III. A function of the first-stage pressure reduction valve I is to perform first-stage pressure reduction on high-pressure hydrogen input, while functions of the second-stage pressure reduction and flow regulation valve II and the second-stage pressure reduction and regulation valve III are both to perform second-stage pressure reduction on the hydrogen after the first-stage pressure reduction. However, the second-stage pressure reduction and regulation valve III merely needs to perform pressure reduction, while the second-stage pressure reduction and flow regulation valve II needs to regulate hydrogen flow passed in addition to pressure reduction. The purpose of the disclosure in disposing the second-stage pressure reduction and flow regulation valve II and the second-stage pressure reduction and regulation valve III in parallel in the second-stage pressure reduction is to stabilize the outlet pressure as much as possible while the outlet flow regulation of the hydrogen supply combination valve is achieved, in which the outlet hydrogen flow is merely regulated through the second-stage pressure reduction and flow regulation valve II, while the second-stage pressure reduction and regulation valve III maintains a continuous and stable flow output, thereby the fluctuations of the outlet pressure during the flow regulation process is significantly reduced. Specific structures of the combination valve body, the first-stage pressure reduction valve I, the second-stage pressure reduction and flow regulation valve II, and the second-stage pressure reduction and regulation valve III are described in detail below.

Figure 2:
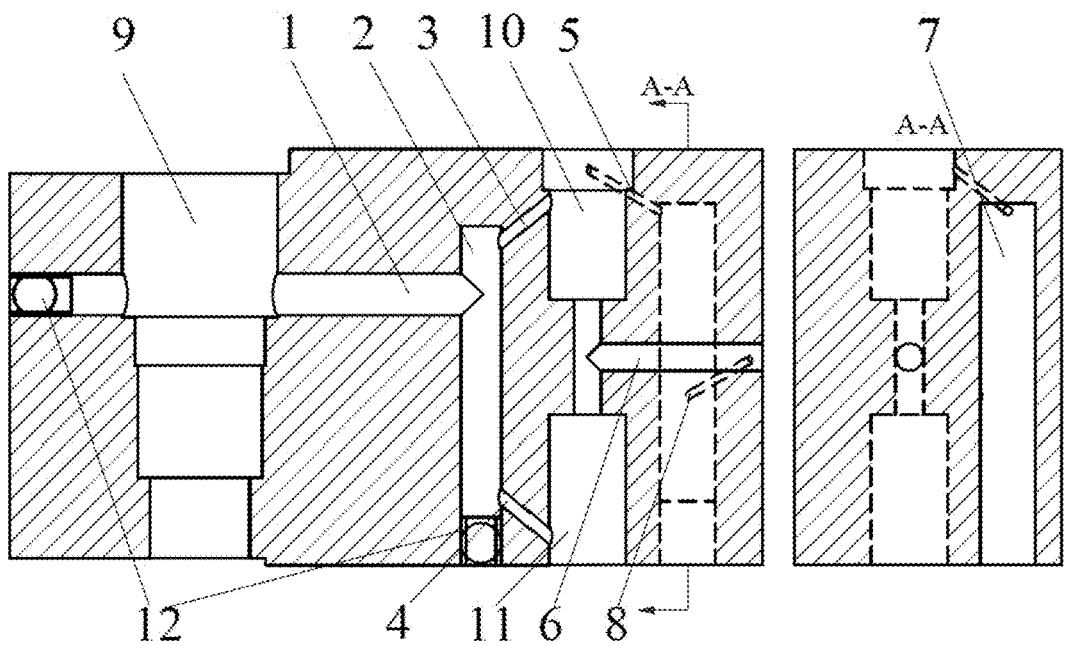
FIG. 2 is a schematic structural diagram of flow channels and valve bases in a combination valve body according to an embodiment of the disclosure.

As shown in FIG. 2, the combination valve body connects the three regulation valves through opening a series of channels and valve bases, thereby the function of the entire valve is realized. Specifically, the combination valve body is provided with a first-stage outlet flow channel 1, a connecting flow channel 2, a first channel 3, a second channel 4, a third channel 5, a second-stage outlet flow channel 6, a pressure regulating hydrogen storage flow channel 7, a fourth channel 8, a first valve base 9, a second valve base 10, a third valve base 11, and a cylindrical seal 12. For the convenience of description, the horizontal direction shown in FIG. 1 is referred to as a length direction of the combination valve body, the vertical direction shown in FIG. 1 is referred to as a height direction of the combination valve body, and the direction perpendicular to the paper surface of FIG. 1 is referred to as a width direction of the combination valve body. In this way, the first valve base 9 adopts a through stepped hole design, and the first-stage outlet flow channel 1 runs through the middle and upper part of the first valve base 9. The first-stage outlet flow channel 1 is disposed along the length direction of the combination valve body and orthogonally communicated with the connecting flow channel 2. The connecting flow channel 2 is disposed along the height direction of the combination valve body and communicated with the first channel 3 and the second channel 4 of oblique directions. The first channel 3 and the second channel 4 are communicated with the upper parts of the second valve base 10 and the third valve base 11 respectively. The second valve base 10 and the third valve base 11 are symmetrically disposed in the height direction of the combination valve body. The second valve base 10 and the third valve base 11 are first-stage stepped holes. The second-stage outlet flow channel 6 is formed in a T-shape, and the second-stage outlet flow channel 6 communicates with the second valve base 10 and the third valve base 11 at the same time. The pressure regulating hydrogen storage flow channel 7 is disposed on a side of the second-stage outlet flow channel 6 along the width direction. The pressure regulating hydrogen storage flow channel 7 is connected to the upper part of the second valve base 10 and the second-stage outlet flow channel 6 through the third channel 5 and the fourth channel 8 respectively. Since the first-stage outlet flow channel 1 and the connecting flow channel 2 are drilled from the surface of the combination valve body to the inside, when the installation of remaining components is completed, opening ends located at the surface of the combination valve body all need to be sealed with the cylindrical seals 12.

In the combination valve body, the first-stage pressure reduction valve I, the second-stage pressure reduction and flow regulation valve II, and the second-stage pressure reduction and regulation valve III are installed in the combination valve body through the first valve base 9, the second valve base 10, and the third valve base 11 respectively. The combination valve body is disposed with the first-stage outlet flow channel 1, the connecting flow channel 2, the second-stage outlet flow channel 6, and the pressure regulating hydrogen storage flow channel 7. The first-stage outlet flow channel 1 communicates with the connecting flow channel 2, and the second-stage outlet flow channel 6 serves as a final output flow channel of the hydrogen supply combination valve.

In the hydrogen supply combination valve according to the disclosure, the flow channels and valve bases may be processed as follows. Firstly, the first valve base 9, the connecting flow channel 2, the first-stage outlet flow channel 1, and the pressure regulating hydrogen storage flow channel 7 are processed, so that the connecting flow channel 2 and the first-stage outlet flow channel 1 are vertically and penetratingly connected. Then, the second valve base 10 and the third valve base 11 are processed, and arranged coaxially. Next, the second-stage outlet flow channel 6 formed in a T-shape is processed, and the second valve base 10 and the third valve base 11 are penetratingly connected through two ends of the second-stage outlet flow channel 6. Finally, the first channel 3 is processed, so that the connecting flow channel 2 is penetratingly connected to the second valve base 10; the second channel 4 is processed, so that the connecting flow channel 2 is connected to the third valve base 11; the third channel 5 is processed, so that the second valve base 10 is connected to the pressure regulating hydrogen storage flow channel 7; and the fourth channel 8 is processed, so that the second-stage outlet flow channel 6 is connected to the pressure regulating hydrogen storage flow channel 7. Certainly, the processing flow is merely an implementation manner, and other processing manners may also be used to implement the disclosure.

In the hydrogen supply combination valve, the first-stage pressure reduction valve I is used to connect an external hydrogen source and perform first-stage pressure reduction on the hydrogen input and input into the first-stage outlet flow channel 1, and the specific structure may be implemented by using any pressure reducing valve structure in related art, as long as the pressure reduction function may be realized on the high-pressure hydrogen input from the external hydrogen source.

Figure 3:
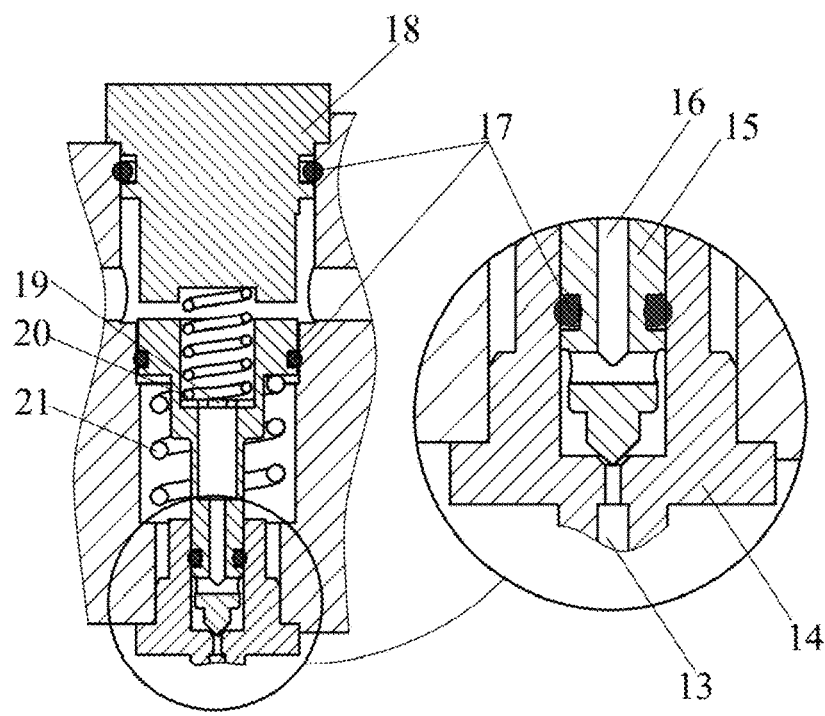
FIG. 3 is a schematic structural diagram of a first-stage pressure reduction valve according to an embodiment of the disclosure.

In an embodiment of the disclosure, as shown in FIG. 3, components forming the first-stage pressure reduction valve I mainly include an inlet flow channel 13, a first throttling bottom base 14, a first actuator 15, an actuator internal flow channel 16, a first sealing gasket 17, a first sealing piston 18, a disk with hole 19, a first spring 20, and a second spring 21. The first valve base 9 penetrates the combination valve body entirely, and is in the form of a through stepped hole on the combination valve body. The first throttling bottom base 14 and the first sealing piston 18 are sealed and fixed to openings at two ends of the first valve base 9 respectively, and form sealing pairs with the inner wall of the first valve base 9 to prevent internal gas from overflowing. The first throttling bottom base 14 and the first sealing piston 18 remain relatively fixed with respect to the first valve base 9. A center position of the first valve base 9 is disposed with the inlet flow channel 13 penetratingly. An inlet end of the inlet flow channel 13 extends out of the outer wall of the combination valve body to connect to the external hydrogen source, while an outlet end of the inlet flow channel 13 is toward the inside of the combination valve body. The first actuator 15 is installed in the first valve base 9 and is located between the first throttling bottom base 14 and the first sealing piston 18. A space between the first actuator 15 and the first sealing piston 18 communicates with the first-stage outlet flow channel 1. An end of the first actuator 15 is a first tapered structure, and another end is a cylindrical section connected to the first tapered structure. The cylindrical section of the first actuator 15 is installed in the first valve base 9 below the first-stage outlet flow channel 1, and may move up and down along the first valve base 9 axially. The first actuator 15 and the first throttling bottom base 14 are the main throttling components. The first tapered structure of the first actuator 15 cooperates with the first throttling bottom base 14 to form a first throttling section at the outlet end of the inlet flow channel 13. The first spring 20 in a compressed state is disposed between the first actuator 15 and the first sealing piston 18, the second spring 21 in the compressed state is disposed between the first actuator 15 and the first throttling bottom base 14, and the first spring 20 and the second spring 21 exert pressures of two opposite directions on the first actuator 15 respectively. Certainly, during the working process, in addition to the forces from the two springs, the first actuator 15 is also affected by the high-pressure inlet pressure and the low-pressure outlet pressure, in which the high-pressure inlet pressure has a small effect area, and the low-pressure outlet pressure has a large effect area. Therefore, the first throttling section as a whole achieves a stable pressure reduction effect under the action of the four forces. Accordingly, the first actuator 15 can maintain a balanced position under the two opposite forces exerted by the first spring 20 and the second spring 21, and can also be restored to the position after being moved under the action of the external force, thus ensuring that the first throttling section can meet the requirement of the target opening. The opening of the first throttling section changes with a distance between the first tapered structure and the first throttling bottom base 14, in which the smaller the distance, the smaller the corresponding overflow area, and the smaller the opening, and on the contrary, the larger the distance, the larger the corresponding overflow area, and the larger the opening. In the disclosure, models of the first spring 20 and the second spring 21 may be selected, and the opening of the first throttling section may be regulated through controlling the forces exerted by the two springs, thereby the amount of pressure of the external high-pressure hydrogen after passing through the first throttling section is regulated. The first actuator 15 is disposed with the actuator internal flow channel 16 communicating to a top surface of the first actuator 15. There is a gap space between the outer side wall at the bottom of the first tapered structure and the side wall of the first valve base 9, so that the inlet flow channel 13 may communicate with the actuator internal flow channel 16. The inlet end of the inlet flow channel 13 is used to connect the external hydrogen source. The hydrogen input sequentially passes through the inlet flow channel 13, the first throttling section, and the actuator internal flow channel 16 and then enters the first-stage outlet flow channel 1, and the first-stage pressure reduction is completed.

In addition, in order to ensure the sealing performance of the first-stage pressure reduction valve I, the first sealing gasket 17 is disposed in three different positions. Specifically, between the first sealing piston 18 and the inner wall of the first valve base 9, between the first throttling bottom base 14 and the inner wall of the first valve base 9, and between the first throttling bottom base 14 and the first actuator 15 are all sealed and connected through the first sealing gaskets 17. Certainly, the specific disposed position of the first sealing gasket 17 may be adjusted according to the actual situation. If reliable sealing can be achieved through other sealing methods, the first sealing gasket 17 may not be disposed.

In addition, in order to facilitate reliable installation, the first throttling bottom base 14 and the first sealing piston 18 are both disposed with spring install holes coaxially at an install position of the first spring 20, and the disk with hole 19 communicating with the actuator internal flow channel 16 is placed at the bottom of the spring install hole of the first throttling bottom base 14. An end of the first spring 20 is supported on the disk with hole 19, and another end is supported in the spring install hole of the first sealing piston 18. Therefore, by disposing the disk with hole 19, reliable installation positions may be provided for the first spring 20 while ensuring that the actuator internal flow channel 16 may exhaust air smoothly.

In the disclosure, the second-stage pressure reduction and flow regulation valve II and the second-stage pressure reduction and regulation valve III are connected in parallel after the first-stage pressure reduction valve I, and are used to cooperate to realize the pressure and flow control of the outlet hydrogen.

Figure 4:
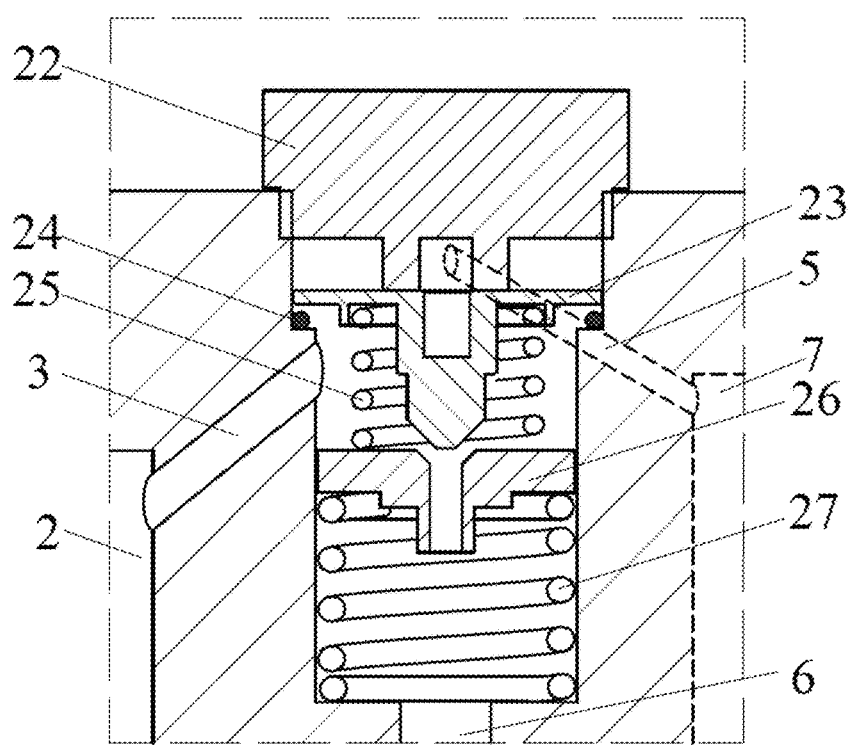
FIG. 4 is a schematic structural diagram of a second-stage pressure reduction and flow regulation valve according to an embodiment of the disclosure.

As shown in FIG. 4, in an embodiment of the disclosure, the second-stage pressure reduction and flow regulation valve II includes a second sealing piston 22, a second actuator 23, a third spring 25, a second throttling bottom base 26, and a fourth spring 27. The second valve base 10 is a stepped hole which does not penetrate the combination valve body. An end of the second valve base 10 toward the outer wall of the combination valve body serves as an opening end. The second sealing piston 22 is sealed and fixed at an opening end of the second valve base 10, the second actuator 23 and the second throttling bottom base 26 are installed in the second valve base 10, and the second actuator 23 is located between the second throttling bottom base 26 and the second sealing piston 22. A protruding blocking ring is disposed on a side of the second sealing piston (22) toward the second actuator (23), so as to prevent the second actuator 23 from completely attaching with the inner bottom surface of the second sealing piston 22. In this embodiment, the second actuator 23 includes a second tapered structure connected below a circular plate, the side wall of the second valve base 10 has a stepped surface, and a second sealing gasket 24 is placed on the stepped surface. When moving in the direction of the second throttling bottom base 26, the circular plate may be pressed on the second sealing gasket 24 to ensure that a first chamber and a second chamber are sealed and not communicated. An inner cavity of the second valve base 10 is separated by the second sealing piston 22, the second actuator 23, and the second throttling bottom base 26 to form the first chamber, the second chamber, and a third chamber independently from the opening end to the inner bottom surface sequentially. The first chamber and the second chamber remain not communicated with each other; and the second chamber and the third chamber are not directly communicated with each other, but are communicated through a second throttling section. The third spring 25 in the compressed state is disposed between the second actuator 23 and the second throttling bottom base 26, and the fourth spring 27 in the compressed state is disposed between the second throttling bottom base 26 and the inner bottom surface of the second valve base 10. A secondary-stage outlet flow channel for communicating the second chamber and the third chamber is opened at the center of the second throttling bottom base 26. An end of the second actuator 23 is the second tapered structure, and the second tapered structure cooperates with the second throttling bottom base 26 to form the second throttling section at the inlet position of the secondary-stage outlet flow channel. Also, similar to the first throttling section, the opening of the second throttling section changes with a distance between the second tapered structure and the second throttling bottom base 26, in which the smaller the distance, the smaller the corresponding overflow area, and the smaller the opening, and on the contrary, the larger the distance, the larger the corresponding overflow area, and the larger the opening. In the disclosure, models of the third spring 25 and the fourth spring 27 may be selected, and the opening of the second throttling section may be regulated through controlling the forces exerted by the two springs, thereby the amount of pressure of the hydrogen after the first-stage pressure reduction after passing through the second throttling section is regulated.

Figure 5:
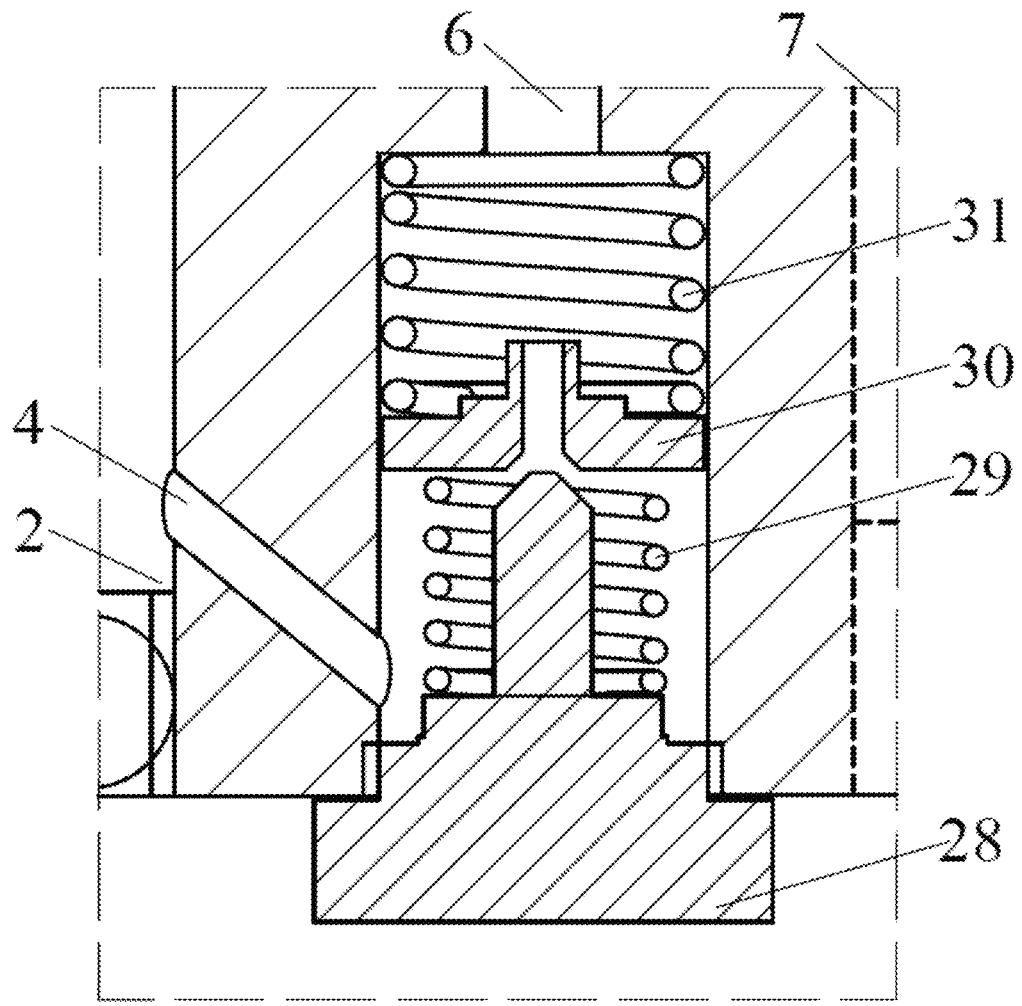
FIG. 5 is a schematic diagram of a second-stage pressure reduction and regulation valve according to an embodiment of the disclosure.

As shown in FIG. 5, the second-stage pressure reduction and regulation valve III includes a third sealing piston 28, a fifth spring 29, a third throttling bottom base 30, and a sixth spring 31. The third valve base 11 is a stepped hole which does not penetrate the combination valve body. The third sealing piston 28 is sealed and fixed on the opening end of the third valve base 11, and the third throttling bottom base 30 is installed in the third valve base 11. An inner cavity of the third valve base 11 is separated by the third sealing piston 28 and the third throttling bottom base 30 to form a fourth chamber and a fifth chamber independently from the opening end to the inner bottom surface sequentially. The fourth chamber and the fifth chamber are not directly communicated with each other, but may merely communicate through the third throttling section. The fifth spring 29 in the compressed state is disposed between the third sealing piston 28 and the third throttling bottom base 30, and the sixth spring 31 in the compressed state is disposed between the third throttling bottom base 30 and the inner bottom surface of the third valve base 11. A tertiary-stage outlet flow channel for communicating the fourth chamber and the fifth chamber is opened at the center of the third throttling bottom base 30. An end of the third sealing piston 28 is a third tapered structure, and the third tapered structure cooperates with the third throttling bottom base 30 to form a third throttling section at the inlet position of the tertiary-stage outlet flow channel. Also, similar to the second throttling section, the opening of the third throttling section changes with a distance between the third tapered structure and the third throttling bottom base 30, in which the smaller the distance, the smaller the corresponding overflow area, and the smaller the opening, and on the contrary, the larger the distance, the larger the corresponding overflow area, and the larger the opening. In the disclosure, models of the fifth spring 29 and the sixth spring 31 may be selected, and the opening of the third throttling section may be regulated through controlling the forces exerted by the two springs, thereby the amount of pressure of the hydrogen after the first-stage pressure reduction after passing through the third throttling section is regulated.

In the disclosure, according to the functional design of the three pressure reducing valves, the second-stage pressure reduction and regulation valve III merely needs to perform pressure reduction, while the second-stage pressure reduction and flow regulation valve II needs to regulate the hydrogen flow passed in addition to pressure reduction. Therefore, the additional hydrogen flow regulation function in the second-stage pressure reduction and flow regulation valve II compared to the second-stage pressure reduction and regulation valve III is achieved by cooperating with the pressure regulating hydrogen storage flow channel 7. Specifically, the second chamber and the fourth chamber communicate with the connecting flow channel 2 through the first channel 3 and the second channel 4 respectively. The connecting flow channel 2 connects after the first-stage outlet flow channel 1, and may store the hydrogen after the first-stage pressure reduction; the hydrogen stored in the connecting flow channel 2 may enter the second chamber and the fourth chamber through the first channel 3 and the second channel 4 respectively, and pass through the second throttling section and the third throttling section respectively to continue the second-stage pressure reduction to a target outlet pressure. The third chamber and the fifth chamber communicate with the second-stage outlet flow channel 6 respectively, and the hydrogen after the second-stage pressure reduction passes through the second-stage outlet flow channel 6 to finally output to the outside. It is worth noting that the first chamber and the second-stage outlet flow channel 6 communicate with the pressure regulating hydrogen storage flow channel 7 through the third channel 5 and the fourth channel 8 respectively, so the hydrogen in the pressure regulating hydrogen storage flow channel 7 may be pressed into the first chamber of the second-stage pressure reduction and flow regulation valve II through the third channel 5. When the pressure in the first chamber increases, since the first chamber is sealed, the second actuator 23 is pushed downward to reduce the opening of the second throttling section, thereby the hydrogen flow output through the second-stage pressure reduction and flow regulation valve II is reduced. Although the flow regulation process causes fluctuations of the outlet pressure of the final second-stage outlet flow channel 6, since the second-stage pressure reduction and regulation valve III continues to output stable hydrogen flow and pressure and can act as a buffer to the fluctuations of the pressure caused by the second-stage pressure reduction and flow regulation valve II, so as to keep the outlet pressure of the second-stage outlet flow channel 6 as stable as possible.

Figure 6:
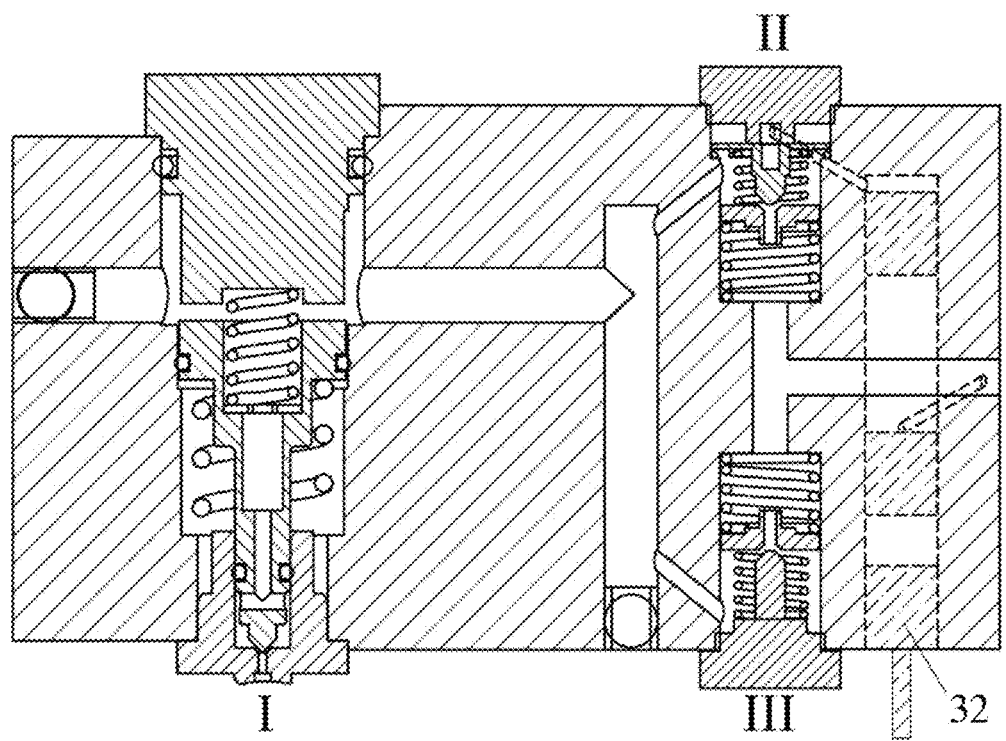
FIG. 6 is a schematic diagram of three key positions of a controllable sliding piston in a pressure regulating hydrogen storage flow channel according to an embodiment of the disclosure.

Therefore, the hydrogen output flow in the disclosure is mainly regulated by relying on the pressure exerted by the pressure regulating hydrogen storage flow channel 7 on the first chamber. In order to ensure the regulation effect, a first connection of the pressure regulating hydrogen storage flow channel 7 and the third channel 5 and a second connection of the pressure regulating hydrogen storage flow channel 7 and the fourth channel 8 are kept apart, so that the pressure regulating hydrogen storage flow channel 7 between the first connection and the second connection may serve as a pressure regulating section. The pressure regulating hydrogen storage flow channel 7 is disposed with a controllable sliding piston 32 forming a piston pair with the inner wall of a flow channel. The controllable sliding piston 32 refers to a piston that may controllably slide in the pressure regulating hydrogen storage flow channel 7. In this embodiment, the controllable sliding piston 32 may be disposed with a control rod, and the control rod extends out of the combination valve body and maintains dynamically sealed at a contact position with the combination valve body, thereby the controllable sliding piston 32 may be driven to slide through the control rod. A sliding stroke of the controllable sliding piston 32 in the pressure regulating hydrogen storage flow channel 7 needs to cover the pressure regulating section. In this way, the controllable sliding piston 32 controls the opening of the second throttling section by changing the pressure in the first chamber during a sliding process in the pressure regulating section, thereby the hydrogen flow output from the second-stage outlet flow channel 6 is changed. As shown in FIG. 6, in actual applications, there are three key positions in the entire stroke of the controllable sliding piston 32, in which a position A is an initial position at the bottom of the pressure regulating hydrogen storage flow channel 7, a position B is a position where the controllable sliding piston 32 is about to block the second connection, and a position C is a position where the controllable sliding piston 32 is about to block the first connection. Under a normal state, the controllable sliding piston 32 may be in the position A. At this time, the entire valve outputs stable pressure hydrogen according to a maximum flow. When it is necessary to regulate the outlet hydrogen flow of the valve, the controllable sliding piston 32 may be driven to move upward. When the controllable sliding piston 32 slides from the position A to the position B, due to the existence of the fourth channel 8, the pressure in the pressure regulating hydrogen storage flow channel 7 does not change. However, when the controllable sliding piston 32 slides from the position B to the position C, the pressure in the pressure regulating hydrogen storage flow channel 7 rises, thereby causing the pressure in the first chamber to rise simultaneously, pushing the second actuator 23 to move downward, and reducing the opening of the second throttling section, so that the hydrogen flow output through the second-stage pressure reduction and flow regulation valve II is reduced. When the controllable sliding piston 32 is in the position C, the hydrogen flow output from the second-stage pressure reduction and flow regulation valve II is minimum. Therefore, as a preferred option, if the second-stage pressure reduction and flow regulation valve II needs to be fully closed, that is, the hydrogen flow output through the second-stage pressure reduction and flow regulation valve II is 0, then the controllable sliding piston 32 should completely close the second throttling section during the sliding process in the pressure regulating section, which may be achieved by adjusting the volume of the pressure regulating section.

Since in the flow regulation process of the second-stage pressure reduction and flow regulation valve II, it is necessary to press the gas in the pressure regulating hydrogen storage flow channel 7 into the first chamber to realize driving of the second actuator 23. Therefore, a position of the connection between the third channel 5 and the side wall of the first chamber is preferably disposed in a range of a height of the blocking ring on the second sealing piston 22, thereby ensuring that the connection between the third channel 5 and the side wall of the first chamber is not covered by the second actuator 23.

In addition, it should be noted that in the hydrogen supply combination valve having flow regulation and pressure stabilization functions according to the disclosure, a combination valve which can achieve two-stage pressure reduction, having stable output pressure, and adjustable output flow is merely provided, but the specific pressure reduction range and flow regulation may be adjusted according to actual needs. For different output parameters such as pressure reduction range and flow regulation, the control of the corresponding output parameter may be achieved through optimizing structure parameters of the first throttling section, the second throttling section, and the third throttling section.

An application scenario of the hydrogen supply combination valve according to the disclosure is to supply hydrogen to an on-board hydrogen fuel cell. A working pressure of the on-board hydrogen fuel cell is generally 0.16 MPa. Therefore, for the combined hydrogen bottle valve of the on-board hydrogen fuel cell, a stable and large pressure drop of hydrogen from 70 MPa to 0.16 MPa has to be achieved. In this application scenario, the structure parameters of the first throttling section, the second throttling section, and the third throttling section may be optimized, so that the range of the hydrogen pressure of the external hydrogen source is in a range of 10 to 70 MPa. After the hydrogen passes through the first-stage pressure reduction valve I, the hydrogen pressure is reduced to a range of 2 to 3 MPa, after passing through the second-stage pressure reduction and flow regulation valve II, the hydrogen pressure is reduced to the working pressure of the on-board hydrogen fuel cell, and after passing through the second-stage pressure reduction and regulation valve III, the hydrogen pressure is reduced to the working pressure of the on-board hydrogen fuel cell of 0.16 MPa. The specific workflow is as follows.

S1. The high-pressure hydrogen pressure input is in a range of 10 to 70 MPa. The first-stage pressure reduction valve I is controlled to be with a smaller opening and a larger flow resistance coefficient comparing with the second-stage pressure reduction and flow regulation valve II and the second-stage pressure reduction and regulation valve III, so that the pressure of the hydrogen is reduced to a range of 2 to 3 MPa after passing through the first-stage pressure reduction valve I.

S2. The throttling area of the second-stage pressure reduction and regulation valve III is large, so as to realize the pressure reduction from the range of 2 to 3 MPa to 0.16 MPa, and the flow of the second-stage pressure reduction and regulation valve III can be maintained unchanged.

S3. The throttling area of the second-stage pressure reduction and flow regulation valve II is large, so as to realize the pressure reduction from the range of 2 to 3 MPa to 0.16 MPa similarly, and through regulating the pressure of the pressure regulating hydrogen storage flow channel 7, regulating the opening of the second-stage pressure reduction and flow regulation valve II can be achieved, thereby the amount of flow passing through the valve can be regulated. Through the regulation of the piston, the second-stage pressure reduction and flow regulation valve II can be fully closed, so as to achieve the minimum flow of the hydrogen transported.

Certainly, the range of the parameters may be adjusted according to actual working conditions, and the embodiments are merely a preferred implementation manner.

It should be understood that the embodiments are merely a part of some embodiments according to the disclosure, not all of the embodiments. Based on the embodiments of the disclosure, all other embodiments obtained by persons of ordinary skill in the art without making creative efforts fall within the scope of protection of the disclosure.

What is claimed is:

1. A hydrogen supply combination valve having flow regulation and pressure stabilization functions, comprising:
a combination valve body, a first-stage pressure reduction valve, a second-stage pressure reduction and flow regulation valve, and a second-stage pressure reduction and regulation valve, wherein the first-stage pressure reduction valve, the second-stage pressure reduction and flow regulation valve, and the second-stage pressure reduction and regulation valve are installed in the combination valve body through a first valve base, a second valve base, and a third valve base respectively; the combination valve body is disposed with a first-stage outlet flow channel, a connecting flow channel, a second-stage outlet flow channel, and a pressure regulating hydrogen storage flow channel; and the first-stage outlet flow channel communicates with the connecting flow channel, and the second-stage outlet flow channel serves as a final output flow channel of the hydrogen supply combination valve;

wherein the first-stage pressure reduction valve is configured to connect an external hydrogen source and perform first-stage pressure reduction on hydrogen input and input into the first-stage outlet flow channel;

wherein the second-stage pressure reduction and flow regulation valve comprises a second sealing piston, a second actuator, a third spring, a second throttling bottom base, and a fourth spring; the second valve base does not penetrate the combination valve body, the second sealing piston is sealed and fixed at an opening end of the second valve base, the second actuator and the second throttling bottom base are installed in the second valve base, the second actuator is located between the second throttling bottom base and the second sealing piston, and a protruding blocking ring is disposed on a side of the second sealing piston toward the second actuator; an inner cavity of the second valve base is separated by the second sealing piston, the second actuator, and the second throttling bottom base to form a first chamber, a second chamber, and a third chamber independently from the opening end to an inner bottom surface sequentially; the third spring in a compressed state is disposed between the second actuator and the second throttling bottom base, and the fourth spring in the compressed state is disposed between the second throttling bottom base and the inner bottom surface of the second valve base; and a secondary-stage outlet flow channel configured to communicate with the second chamber and the third chamber is opened at a center of the second throttling bottom base, an end of the second actuator is a second tapered structure, and the second tapered structure cooperates with the second throttling bottom base to form a second throttling section at an inlet position of the secondary-stage outlet flow channel;

wherein the second-stage pressure reduction and regulation valve comprises a third sealing piston, a fifth spring, a third throttling bottom base, and a sixth spring; the third valve base does not penetrate the combination valve body, the third sealing piston is sealed and fixed at an opening end of the third valve base, the third throttling bottom base is installed in the third valve base, and an inner cavity of the third valve base is separated by the third sealing piston and the third throttling bottom base to form a fourth chamber and a fifth chamber independently from the opening end to an inner bottom surface sequentially; the fifth spring in the compressed state is disposed between the third sealing piston and the third throttling bottom base, the sixth spring in the compressed state is disposed between the third throttling bottom base and the inner bottom surface of the third valve base; and a tertiary-stage outlet flow channel configured to communicate with the fourth chamber and the fifth chamber is opened at a center of the third throttling bottom base, an end of the third sealing piston is a third tapered structure, and the third tapered structure cooperates with the third throttling bottom base to form a third throttling section at an inlet position of the tertiary-stage outlet flow channel; and the second chamber and the fourth chamber communicate with the connecting flow channel through a first channel and a second channel respectively; the third chamber and the fifth chamber communicate with the second-stage outlet flow channel respectively; the first chamber and the second-stage outlet flow channel communicate with the pressure regulating hydrogen storage flow channel through a third channel and a fourth channel respectively; a first connection of the pressure regulating hydrogen storage flow channel and the third channel and a second connection of the pressure regulating hydrogen storage flow channel and the fourth channel are kept apart, the pressure regulating hydrogen storage flow channel between the first connection and the second connection serves as a pressure regulating section; the pressure regulating hydrogen storage flow channel is disposed with a controllable sliding piston forming a piston pair with an inner wall of a flow channel, and a sliding stroke of the controllable sliding piston in the pressure regulating hydrogen storage flow channel covers the pressure regulating section; and the controllable sliding piston controls an opening of the second throttling section by changing a pressure in the first chamber during a sliding process in the pressure regulating section, thereby hydrogen flow output from the second-stage outlet flow channel is changed.

2. The hydrogen supply combination valve having flow regulation and pressure stabilization functions as claimed in claim 1, wherein the first-stage pressure reduction valve comprises an inlet flow channel, a first throttling bottom base, a first actuator, an actuator internal flow channel, a first sealing piston, a first spring, and a second spring;
wherein the first valve base penetrates the combination valve body entirely, the first throttling bottom base and the first sealing piston are sealed and fixed at openings at two ends of the first valve base respectively, and the first valve base is disposed with the inlet flow channel penetratingly; the first actuator is installed in the first valve base and is located between the first throttling bottom base and the first sealing piston, an end of the first actuator is a first tapered structure, and the first tapered structure cooperates with the first throttling bottom base to form a first throttling section at an outlet end of the inlet flow channel; the first spring in the compressed state is disposed between the first actuator and the first sealing piston, the second spring in the compressed state is disposed between the first actuator and the first throttling bottom base, and the first spring and the second spring exert pressures of two opposite directions on the first actuator respectively; and the first actuator is disposed with the actuator internal flow channel communicating with a top surface of the first actuator, an inlet end of the inlet flow channel is configured to connect the external hydrogen source, and the hydrogen input sequentially passes through the inlet flow channel, the first throttling section, and the actuator internal flow channel and then enters the first-stage outlet flow channel.

3. The hydrogen supply combination valve having flow regulation and pressure stabilization functions as claimed in claim 2, wherein the first throttling bottom base and the first sealing piston are both disposed with spring install holes coaxially at an install position of the first spring, a disk with hole communicating with the actuator internal flow channel is placed at a bottom of the spring install hole of the first throttling bottom base, an end of the first spring is supported on the disk with hole, and the other end is supported in the spring install hole of the first sealing piston.

4. The hydrogen supply combination valve having flow regulation and pressure stabilization functions as claimed in claim 2, wherein between the first sealing piston and an inner wall of the first valve base, between the first throttling bottom base and an inner wall of the first valve base, and between the first throttling bottom base and the first actuator are all sealed and connected through first sealing gaskets.

5. The hydrogen supply combination valve having flow regulation and pressure stabilization functions as claimed in claim 1, wherein the first-stage outlet flow channel and the connecting flow channel are both drilled from a surface of the combination valve body to inside, and opening ends thereof located on the surface of the combination valve body are all sealed with cylindrical seals.

6. The hydrogen supply combination valve having flow regulation and pressure stabilization functions as claimed in claim 1, wherein the controllable sliding piston is disposed with a control rod, and the control rod extends out of the combination valve body and maintains dynamically sealed at a contact position with the combination valve body.

7. The hydrogen supply combination valve having flow regulation and pressure stabilization functions as claimed in claim 1, wherein a position of a connection between the third channel and a side wall of the first chamber is in a range of a height of the blocking ring.

8. The hydrogen supply combination valve having flow regulation and pressure stabilization functions as claimed in claim 1, wherein the second actuator comprises the second tapered structure connected below a circular plate, a side wall of the second valve base has a stepped surface, and a second sealing gasket is placed on the stepped surface,
wherein the circular plate is pressed on the second sealing gasket in response to moving in a direction of the second throttling bottom base to ensure that the first chamber and the second chamber are sealed and not communicated.

9. The hydrogen supply combination valve having flow regulation and pressure stabilization functions as claimed in claim 1, wherein the controllable sliding piston completely closes the second throttling section during the sliding process in the pressure regulating section.

10. The hydrogen supply combination valve having flow regulation and pressure stabilization functions as claimed in claim 1, wherein a range of a hydrogen pressure of the external hydrogen source is in a range of 10 to 70 MPa, the hydrogen pressure is reduced to a range of 2 to 3 MPa after passing through the first-stage pressure reduction valve, the hydrogen pressure is reduced to a working pressure of an on-board hydrogen fuel cell after passing through the second-stage pressure reduction and flow regulation valve, and the hydrogen pressure is reduced to the working pressure of the on-board hydrogen fuel cell after passing through the second-stage pressure reduction and regulation valve.

\* \* \* \* \*